United States Patent [19]

Dohner

[11] Patent Number: 4,737,305

[45] Date of Patent: Apr. 12, 1988

[54] DUST SUPPRESSANT COMPOSITION AND METHOD

[75] Inventor: Brent R. Dohner, The Woodlands, Tex.

[73] Assignee: Pennzoil Products Company, Houston, Tex.

[21] Appl. No.: 856,931

[22] Filed: Apr. 25, 1986

[51] Int. Cl.$^4$ .................................................. C09K 3/22
[52] U.S. Cl. .......................................... 252/88; 55/84; 299/12; 404/76
[58] Field of Search .............................. 252/88, 174.22

[56] References Cited

U.S. PATENT DOCUMENTS

| | | | |
|---|---|---|---|
| 3,156,655 | 11/1964 | Bright | 252/109 |
| 3,208,949 | 9/1965 | Rosnati | 252/109 |
| 3,222,201 | 12/1965 | Boyle et al. | 106/285 |
| 3,948,819 | 4/1976 | Wilde | 252/545 |
| 4,136,050 | 1/1979 | Brehm | 252/53 |
| 4,169,170 | 9/1979 | Doeksen | 427/155 |
| 4,171,276 | 10/1979 | Brehm | 252/88 |
| 4,233,174 | 11/1980 | Sheridan | 252/170 |
| 4,311,608 | 1/1982 | Maurice | 252/143 |
| 4,332,692 | 6/1982 | Payne et al. | 252/135 |
| 4,369,121 | 1/1983 | Callahan et al. | 252/88 |
| 4,425,252 | 1/1984 | Cargle et al. | 252/88 |
| 4,428,984 | 1/1984 | Shimizu et al. | 427/220 |
| 4,438,009 | 3/1984 | Brusky et al. | 252/90 |
| 4,487,615 | 12/1984 | Taylor et al. | 55/84 |
| 4,588,516 | 5/1986 | Schwartz | 252/174.21 |

FOREIGN PATENT DOCUMENTS 48-43710 6/1973 Japan .............................. 252/174.22

*Primary Examiner*—Dennis Albrecht
*Attorney, Agent, or Firm*—Lowe, Price, LeBlanc, Becker & Shur

[57] ABSTRACT

A dust suppressant composition comprising an aqueous solution of a dust suppressant comprising an ethoxylated alcohol and an ethoxylated alkyl phenol. The ethoxylated alcohol and ethoxylated alkyl phenol are preferably included in a weight ratio of about 1:3 to 3:1 and the dust suppressant is included in the aqueous solution in an amount of about 0.01 to about 1.0 weight percent. The composition is adapted for enhancing the settling of air-borne dust by spraying the composition in the dusty air.

7 Claims, No Drawings

DUST SUPPRESSANT COMPOSITION AND METHOD

FIELD OF THE INVENTION

The present invention relates to a dust suppressant composition and method adapted for enhancing the settling of air-borne dust particles by spraying the composition in the dusty air. More particularly, the present invention relates to a dust suppressant composition comprising an aqueous solution of a dust suppressant and a method therefor.

BACKGROUND OF THE INVENTION

Many mining and industrial locations which produce or use coke, coal, sand or other loose aggregate material must provide means for preventing dust particles from accumulating in the surrounding environment. For example, in coal mines it is often mandatory to provide means for preventing accumulations of coal dust from remaining suspended in the air.

Various dust suppressant compositions and methods are known in the art for spraying in air to reduce air-borne dust or for spraying on substances which develop dust, for example coal aggregates. The Callahan et al U.S. Pat. No. 4,369,121 discloses a composition for controlling dust which comprises a cellulose ether and a wetting agent such as an ethylene oxide condensate of nonyl- or octylphenol, ethylene oxide condensates of straight chain alcohol, fatty acid amides, quaternary ammonium compounds, organic phosphate esters, and sulfonic acids. The Doeksen U.S. Pat. No. 4,169,170 discloses a composition and method for controlling dust during coal transportation wherein the composition comprises an aqueous solution containing an asphalt emulsion or a black liquor lignin product and a water soluble ethoxylated alkyl phenol. The Cargle et al U.S. Pat. No. 4,425,252 discloses an aqueous coal dust abatement composition including a water soluble sulfonic acid salt and ethoxylated nonyl phenol and the Shimizu et al U.S. Pat. No. 4,428,984 discloses a method of preventing dusts by spreading an aqueous solution including an ethoxylated alkyl phenol, alcohol, fatty acid, amine or fatty acid amide and a polyhydric alcohol.

Additionally, the Taylor et al U.S. Pat. No. 4,487,615 discloses a method of reducing mine dust by spraying water including a surfactant produced by reacting ethylene oxide with linear primary alcohols. The Brehm U.S. Pat. Nos. 4,136,050 and 4,171,276 disclose a dust suppression composition comprising an aqueous solution of alkyl phenoxy polyethoxy ethanol and a copolymer of ethylene oxide and propylene oxide.

However, the above dust suppressing compositions and methods all have various disadvantages in that the compositions are not immediately effective and require an extended time for satisfactory performance or that the compositions include excessive aromatic or other less biodegradable or toxic materials. There is therefore a need for a dust suppressant composition which quickly enhances the settling of air-borne dust and which is substantially biodegradable and nontoxic in the environment.

SUMMARY OF THE INVENTION

Accordingly, it is an object of the present invention to provide a dust suppressant composition for enhancing the settling of air-borne dust particles.

It is an additional object of the present invention to provide a dust suppressant composition having improved effectiveness in that it quickly enhances the settling of air-borne dust.

It is a further object of the invention to provide a dust suppressant composition which is substantially biodegradable and nontoxic and does not create adverse environmental effects.

It is also an object of the present invention to provide a method for enhancing the settling of air-borne dust particles in a fast and efficient manner.

These and additional objects and advantages are provided by the dust suppressant composition and method of the present invention. The dust suppressant composition comprises an aqueous composition including about 0.01 to about 1.0 weight percent of a dust suppressant comprising an ethoxylated alcohol and an ethoxylated alkyl phenol. It has been determined that an aqueous composition of the specified dust suppressant comprising an ethoxylated alcohol and an ethoxylated alkyl phenol quickly and efficiently enhances the settling of air-borne dust particles by spraying the aqueous composition in dusty air. Alternatively, the composition may be applied to a dust generating substance in order to control the release of dust therefrom.

Additionally, the dust suppressant composition according to the present invention is substantially biodegradable and nontoxic and does not cause adverse environmental effects. Preferably, the ethoxylated alcohol and the ethoxylated alkyl phenol are included in the dust suppressant in a weight ratio of about 1:3 to about 3:1.

Additional objects and advantages of the composition and method according to the present invention will become apparent from the following detailed description.

DETAILED DESCRIPTION

The present invention relates to a dust suppressant composition comprising an aqueous solution of a dust suppressant. According to the method of the present invention, the dust suppressant composition is sprayed in dusty air in order to enhance the settling of air-borne dust particles. Alternatively, the dust suppressant composition may be applied to a dust generating substance, such as coal aggregates, in order to control the release of dust particles therefrom.

The dust suppressant composition comprises an aqueous composition including about 0.01 to about 1.0 weight percent of a dust suppressant which consists essentially of an ethoxylated alcohol and an ethoxylated alkyl phenol. It has been determined that the dust suppressant comprising an ethoxylated alcohol and an ethoxylated alkyl phenol is effective to quickly enhance the settling of air-borne dust particles, particularly coal dust. The ethoxylated alcohol and the ethoxylated alkyl phenol are included in the dust suppressant in a weight ratio of about 1:3 to about 3:1. Preferably, the dust suppressant consists essentially of the ethoxylated alcohol and the ethoxylated alkyl phenol in a weight ratio of about 1:3.

The ethoxylated alcohol included in the dust suppressant of the present invention preferably comprises a $C_9$–$C_{13}$ alcohol and includes about 4–8 ethylene oxide units. The materials are commercially available. Preferably, the ethoxylated alcohol includes about 6 ethylene oxide units. A commercial material of this type comprises Neodol 91-6, available from Shell Oil Company.

The ethoxylated alkyl phenol included in the dust suppressant of the present invention preferably includes about 8 to 12 ethylene oxide units and at least one alkyl group having about 6 to 12 carbon atoms. A more preferred ethoxylated alkyl phenol includes 9 to 10 ethylene oxide units and an alkyl group having 8 to 9 carbon atoms. These materials are commercially available. Preferred commercial materials of this type include Triton X-100 and Triton N-101 available from Rohm & Haas Company.

Thus, the dust suppressant included in the aqueous composition of the present invention comprises a mixture of the ethoxylated alcohol and the ethoxylated alkyl phenol. The dust suppressant is formed by simple mixing of the essential components in water in the amounts indicated. The alcohol and phenol may be premixed and then dissolved in the water. The dust suppressant is included in the aqueous composition in an amount of about 0.01 to about 1.0 weight percent. Additionally, the aqueous composition may further include an organic cosolvent such as a $C_1$–$C_9$ alcohol, a glycol ether or mixture thereof. The aqueous composition has a reduced aromatic content as compared with certain known dust suppressant compositions and all the components of the aqueous composition are substantially biodegradable and nontoxic.

The dust suppressant properties of the composition according to the present invention are demonstrated in the following example. In the example and through the specification, parts are by weight unless otherwise indicated.

EXAMPLE

In this example, the wetting time of each composition set forth in Table 1 was determined by adding 20 mg of coal dust having a size less than 100 mesh to the surface of the indicated composition. The coal tested was from Pennsylvania and obtained from the Florence Coal Company. The wetting time was recorded when the last trace of coal dust broke the surface of the water. This test demonstrates the dust suppressing ability of the compositions. The results are set forth in Table 1.

TABLE

| Test No. | Water (Gms) | Ethoxylated Alcohol(Gms) | Ethoxylated Phenol(Gms) | Wetting Time(Sec.) |
|---|---|---|---|---|
| 1 | 10 | 2.0 | 0 | 165 |
| 2 | 10 | 1.5 | 0.5 | 129 |
| 3 | 10 | 1.0 | 1.0 | 87 |
| 4 | 10 | 0.5 | 1.5 | 64 |
| 5 | 10 | 0 | 2.0 | 70 |

As can be observed from the Table, the dust suppressants according to the present invention consisting essentially of the ethoxylated alcohol and the ethoxylated alkyl phenol are effective in quickly wetting the coal dust particulate and are therefore effective in quickly enhancing the settling of coal dust. Moreover, as set forth in Test No. 4, when the dust suppressant consists essentially of an ethoxylated alcohol and an ethoxylated alkyl phenol in the preferred ratio of about 1:3, the dust suppressant provides an improved wetting time over either ethoxylated compound alone.

A comparative test was also performed using the above procedure and a commercially available dust suppressant composition comprising an aqueous solution of a sulfonic acid sodium salt and an ethoxylated alkyl phenol. The commercial product had a wetting time of 186 seconds, significantly inferior to the wetting times of the compositions according to the present invention.

The dust suppressant composition according to the present invention may be used in any manner well known in the art to suppress dust particles. In a first preferred method, the dust suppressant composition is sprayed in dusty air in order to enhance the settling of air-borne dust. For example, in coal mines the air-borne coal dust is rapidly settled by spraying the composition of the present invention therein. In this type of environment, it is particularly important that the dust suppressant does not contain toxic materials and that the composition is readily biodegradable. In a second preferred method according to the present invention, the dust suppressant composition is sprayed on the dust generating substance. For example, the dust suppressant composition may be sprayed on coal aggregates contained in an open hopper car or the like in order to prevent coal dust from spreading from the coal aggregates. Other methods for using the dust suppressant composition of the present invention will be apparent to those of ordinary skill in the art.

It will be understood that modifications may be made to the preferred embodiments of the present invention set forth herein without departing from the scope of the invention defined by the claims.

What is claimed is:

1. An aqueous dust suppressing composition consisting essentially of about 0.01 to about 1.0 weight percent of a dust suppressant and water, said dust suppressant consisting essentially of an ethoxylated alcohol and an ethoxylated alkyl phenol in a weight ratio of about 1:3 to 3:1, said ethoxylated alcohol comprising a one or more $C_9$–$C_{13}$ alcohols having about 4 to 8 ethylene oxide units, and said ethoxylated alkyl phenol comprising about 8 to 12 ethylene oxide units and at least one alkyl group having about 6 to 12 carbon atoms.

2. An aqueous composition as defined by claim 1, wherein said ethoxylated alcohol includes about 6 ethylene oxide units.

3. An aqueous composition as defined by claim 1, wherein said ethoxylated alkyl phenol comprises 9 to 10 ethylene oxide units and an alkyl group having 8 to 9 carbon atoms.

4. An aqueous composition as defined by claim 1, further including a $C_1$–$C_9$ alcohol cosolvent.

5. An aqueous composition as defined by claim 1, wherein said dust suppressant consists essentially of said ethoxylated alcohol and said ethoxylated alkyl phenol in a weight ratio of about 1:3.

6. A dust suppressant adapted for dilution with water, consisting essentially of an ethoxylated alcohol and an ethoxylated alkyl phenol in a weight ratio of about 1:3 to 3:1, said ethoxylated alcohol comprising a one or more $C_9$–$C_{13}$ alcohols having about 4 to 8 ethylene oxide units, and said ethoxylated alkyl phenol comprising about 8 to 12 ethylene oxide units and an alkyl group having about 6 to 12 carbon atoms.

7. A dust suppressant as defined by claim 6, wherein said ethoxylated alcohol and said ethoxylated alkyl phenol are included in a weight ratio of about 1:3.

* * * * *